United States Patent
Hillion et al.

(10) Patent No.: US 8,560,207 B2
(45) Date of Patent: Oct. 15, 2013

(54) METHOD OF CONTROLLING THE COMBUSTION OF A DIESEL ENGINE

(75) Inventors: Mathieu Hillion, Paris (FR); Jonathan Chauvin, Neuilly-sur-Seine (FR)

(73) Assignee: IFP, Rueil-Malmaison (FR)

(*) Notice: Subject to any disclaimer, the term of this patent is extended or adjusted under 35 U.S.C. 154(b) by 867 days.

(21) Appl. No.: 12/596,988

(22) PCT Filed: Apr. 3, 2008

(86) PCT No.: PCT/FR2008/000455
§ 371 (c)(1),
(2), (4) Date: Apr. 1, 2010

(87) PCT Pub. No.: WO2008/142261
PCT Pub. Date: Nov. 27, 2008

(65) Prior Publication Data
US 2010/0185378 A1     Jul. 22, 2010

(30) Foreign Application Priority Data
Apr. 23, 2007 (FR) ..................... 07 02940

(51) Int. Cl.
*F02D 41/14* (2006.01)
*F02D 41/30* (2006.01)
*F02D 41/40* (2006.01)

(52) U.S. Cl.
USPC ......................................... 701/103; 123/478

(58) Field of Classification Search
USPC .......................... 123/478, 780; 701/101, 105
See application file for complete search history.

(56) References Cited

U.S. PATENT DOCUMENTS

| | | | | |
|---|---|---|---|---|
| 4,475,507 A * | 10/1984 | Miyaki et al. | ................. | 123/357 |
| 4,494,507 A * | 1/1985 | Yasuhara | ....................... | 123/357 |
| 4,497,294 A * | 2/1985 | Izumi et al. | ................... | 123/357 |
| 4,554,634 A * | 11/1985 | Shinoda | ........................ | 701/113 |
| 4,594,669 A * | 6/1986 | Hosaka | ......................... | 701/103 |
| 4,621,600 A * | 11/1986 | Hasegawa | ..................... | 123/357 |
| 4,630,588 A * | 12/1986 | Sagawa et al. | ................ | 123/506 |
| 4,635,602 A * | 1/1987 | Eheim | .......................... | 123/357 |
| 4,763,626 A * | 8/1988 | Staerzl | ......................... | 123/438 |
| 4,811,231 A * | 3/1989 | Hataoka et al. | ................ | 701/103 |
| 4,817,469 A * | 4/1989 | Shigematsu et al. | ............ | 477/43 |
| 4,825,373 A * | 4/1989 | Nakamura et al. | ............ | 701/105 |
| 4,840,148 A * | 6/1989 | Staerzl | ........................ | 123/73 A |
| 4,873,956 A * | 10/1989 | Fehlmann et al. | ............. | 123/357 |

(Continued)

FOREIGN PATENT DOCUMENTS

EP     0 826 869 A2     3/1998

*Primary Examiner* — Stephen K Cronin
*Assistant Examiner* — Arnold Castro
(74) *Attorney, Agent, or Firm* — Antonelli, Terry, Stout & Kraus, LLP.

(57) ABSTRACT

The invention is a method of controlling the combustion of a diesel engine comprising determining setpoint values for physical parameters linked with the intake of gaseous oxidizer in the combustion chamber, and a setpoint value $\theta_{inj}^{ref}$ for the crank angle at which fuel has to be injected into the combustion chamber. While the engine control system controls actuators in such a way that the values of the physical parameters are equal to the setpoint values, setpoint value $\theta_{inj}^{ref}$ is corrected before the physical parameters reach their setpoint values, by accounting for the differences between the real values of the physical parameters and the setpoint values of these parameters. Finally, the engine control system controls fuel injection into the combustion chamber when the crank angle is equal to this corrected setpoint value $\theta_{inj}^{ref}$ in order to keep combustion optimal.

9 Claims, 1 Drawing Sheet

(56) References Cited

U.S. PATENT DOCUMENTS

| | | | |
|---|---|---|---|
| 4,903,649 A * | 2/1990 | Staerzl | 123/73 A |
| 5,459,664 A * | 10/1995 | Buckalew | 701/99 |
| 5,499,538 A * | 3/1996 | Glidewell et al. | 73/114.41 |
| 5,755,209 A | 5/1998 | Fischer et al. | |
| 6,041,591 A | 3/2000 | Kaneko et al. | |
| 6,202,629 B1 * | 3/2001 | Zhu et al. | 123/339.21 |
| 6,748,920 B2 * | 6/2004 | Ito et al. | 123/299 |
| 7,178,507 B1 | 2/2007 | Gangopadhyay | |
| 8,061,329 B2 * | 11/2011 | Pursifull et al. | 123/446 |
| 2002/0194837 A1 | 12/2002 | Fluga et al. | |
| 2005/0188945 A1 | 9/2005 | Dickerson et al. | |

* cited by examiner

METHOD OF CONTROLLING THE COMBUSTION OF A DIESEL ENGINE

BACKGROUND OF THE INVENTION

1. Field of the Invention

The present invention relates to the field of engine control and more particularly to the combustion control of a diesel engine.

2. Description of Prior Art

Operation of a diesel engine is based on the auto-ignition of a mixture of air, burnt gas and fuel. The engine cycle can be divided into several phases (FIG. 1):

- Upon intake (ADM), intake valve ($S_{ADM}$) allows the mixture of air and of burnt gas into chamber (CHB). The air is taken from the outside environment of the engine. The burnt gas is taken from exhaust manifold (ECH) and sent back to the intake manifold (exhaust gas recirculation EGR). This gas mixture fills combustion chamber (CHB) and mixes with the burnt gas remaining in the chamber since the previous combustion (internal EGR);
- the intake valve closes (IVC: Intake Valve Closing). Piston (PIS) compresses the gas;
- fuel injector (INJ) injects a precise mass of fuel. After a short auto-ignition delay period, the mixture of air, burnt gas and fuel ignites, thus creating an overpressure that pushes the piston backwards; and
- once the piston has gone back down again, exhaust valve ($S_{ECH}$) opens and the gas mixture is thus discharged through the exhaust manifold. After closing of the exhaust valve, part of the gases remains in the cylinder (internal EGR). The gases discharged through the exhaust manifold are divided in two. A part is recirculated towards the intake (EGR) while the rest is discharged out of the engine (via the exhaust).

The goal of engine control is to supply the driver with torque required while minimizing the noise and pollutant emissions. Control of the amounts of the different gases and of the fuel therefore has to be adjusted as finely as possible.

To control the start of combustion of a diesel engine, there are known methods allowing determination of the combustion medium by detectors mounted in the engine. The most precise means is a pressure detector. Such a method is described for example in the following document:

- J. Bengtsson, P. Strandh, R. Johansson, P. Tunestal and B. Johansson, "Control of Homogeneous Charge Compression Ignition (*HCCI*) *Engine Dynamics*", Proceeding of the 2004 American Control Conference, Boston, Jun. 30-Jul. 2, 2004.

However, using such detectors in standard vehicles cannot be considered due to the considerable cost of these detectors. Furthermore, they are generally subject to relatively fast drifts.

There are also known methods wherein the amounts and the timing are optimized on each static working point (engine speed and torque) to bring out an ideal strategy at each point. A test bench calibration is therefore performed in order to obtain the optimum values for the main two data sets:

- the mass of air $M_{air}$ and of burnt gas $M_{gb}$ required in the combustion chamber, denoted by $X_{air}=(M_{air}, M_{gb})$; and
- the mass of fuel $M_f$ and the crank angle $\theta_f$ at which the fuel is injected, denoted by $X_{fuel}=(M_f, \theta_f)$.

However, these strategies are insufficient in transient phases. In fact, during transition phases from one working point to another (change in the vehicle speed or in the road profile), the engine control supervises the various actuators present in the engine to guarantee the desired torque while minimizing the noise, the pollutant emissions and the consumption. This is thus translated into the change from the values of the parameters of the initial point to the values of the parameters of the final point:

$$\begin{cases} X_{air}^{initial} \to X_{air}^{final} & \text{(a)} \\ X_{fuel}^{initial} \to X_{fuel}^{final} & \text{(b)} \end{cases}$$

There are two time scales in the engine. The faster one (50 Hz) corresponds to the entire combustion phenomenon (1 engine cycle). On this scale, the injection strategy ($X_{fuel}$) can be changed to control the combustion. It is the fuel loop (see (b)). The slower one (1 Hz) corresponds to the gas dynamics in the engine manifolds (intake, exhaust, burnt gas recirculation). The strategy of this air loop ($X_{air}$) cannot be changed faster (see (a)).

With current methods, the controlled variables ($X_{air}$, $X_{fuel}$) therefore do not reach their setpoint values at the same time because of the difference in their dynamics. When part of the parameters reach nearly instantaneously their final setpoint value and the other part is still at the initial setpoint values, the engine then produces more pollutant emissions or noise, and it can even stop in some cases.

SUMMARY OF THE INVENTION

The invention is a method providing control of the start of combustion of a diesel engine under transient phase conditions.

The method controls two dynamic loops separately which are independent control of the slower loop (air loop) and adaptation of the faster loop (fuel loop) dynamics to be coherent with the slower loop.

The invention also concerns a diesel engine capable of applying the method according to the invention.

The invention relates to a method of controlling the combustion of a diesel engine, comprising:

- determining setpoint values for physical parameters linked with the intake of gaseous oxidizer in a combustion chamber, and a setpoint value $\theta_{inj}^{ref}$ for a crank angle at which fuel has to be injected into the combustion chamber, with the setpoint values being determined to optimize combustion; and
- an engine control system that controls actuators so that the values of the physical parameters are equal to the setpoint values.

The method also comprises:

- correcting setpoint value $\theta_{inj}^{ref}$ before the physical parameters reach their setpoint values, by accounting for the differences between real values of the physical parameters and the setpoint values of these physical parameters; and
- the engine control system controls fuel injection into the combustion chamber when the crank angle is equal to the corrected setpoint value $\theta_{inj}^{ref}$ in order to keep combustion optimal.

According to the invention, correction $d\theta_{inj}$ can be determined by applying the following:

- estimating the real values of the physical parameters; calculating differences dP, dT and dX between the real values and said setpoint values; and calculating linearization coefficients $\alpha_P$, $\alpha_T$ and $\alpha_X$ defined by linearization of the Knock integral to the first order; and calculating correction $d\theta_{inj}$ by applying the formula as follows:

$$d\theta_{inj} = \alpha_P \cdot dP + \alpha_T \cdot dT + \alpha_X \cdot dX$$

The physical parameters can be selected from among at least the following parameters upon valve closing: pressure in the combustion chamber ($P_{IVC}$), temperature in the combustion chamber ($T_{IVC}$) and a ratio ($X_{IVC}$) between a burnt gas mass and a total gas mass in the combustion chamber.

The setpoint values can be conventionally determined by a setpoint map established on an engine test bench.

Finally, the invention also relates to a diesel engine comprising at least one combustion chamber, a system for injecting fuel into the combustion chamber, at least one intake pipe for intake into the combustion chamber of a gaseous oxidizer, an engine control system for controlling actuators, means for determining setpoint values ($P^{ref}$, $T^{ref}$, $X^{ref}$) to be applied to physical parameters linked with the intake of the gaseous oxidizer in the combustion chamber and a setpoint value $\theta_{inj}^{ref}$ of a crank angle at which a fuel has to be injected into the combustion chamber.

This engine also comprises means for correcting setpoint value $\theta_{inj}^{ref}$ before the physical parameters reach setpoint values, by accounting for a difference between real values of the physical parameters and the setpoint values of these physical parameters ($P^{ref}$, $T^{ref}$, $X^{ref}$) and the engine control system controls the injection system to inject fuel into the combustion chamber when the crank angle is equal to the corrected setpoint value $\theta_{inj}^{ref}$ optimizing combustion.

BRIEF DESCRIPTION OF THE DRAWINGS

Other features and advantages of the method and of the engine according to the invention will be clear from reading the description hereafter of embodiments given by way of non limitative example, with reference to the accompanying figures wherein.

DETAILED DESCRIPTION OF THE INVENTION

Figure 1:
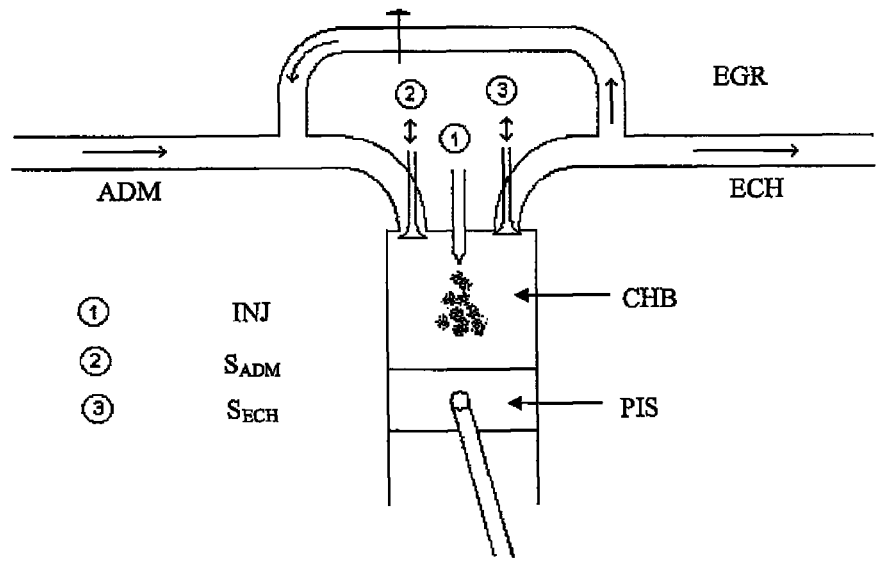
FIG. 1 shows various phases of a combustion cycle of a diesel engine.

The method according to the invention allows control of the combustion of a diesel engine, in a static phase as well as in a transient phase. It comprises separate and independent control of the air loop (slow loop) and of the fuel loop (fast loop), then adaptation of the fuel loop dynamics to be coherent with the air loop. The method thus allows adapting $X_{fuel}$ to keep the characteristics of the combustion required (through the driver's torque request). The impact on emissions and noise is thus limited while ensuring the required torque to the driver.

According to this method, control of the combustion of a diesel engine is carried out in four stages:

1—Determining Setpoint Values for Various Physical Parameters

During transition phases from one working point to another (change in the vehicle speed or in the road profile), the engine control supervises the various actuators present in the engine to guarantee the desired torque while minimizing the noise, the pollutant emissions and the consumption. This is thus translated into the change from the values of parameters $X_{air}$ and $X_{fuel}$ of an initial point to the values of the parameters of a final point:

$$\begin{cases} X_{air}^{initial} \rightarrow X_{air}^{final} & (a) \\ X_{fuel}^{initial} \rightarrow X_{fuel}^{final} & (b) \end{cases}$$

The final values are defined to optimize combustion, that is to burn a maximum amount of fuel in order to minimize emissions and consumption while minimizing the noise. These final values optimizing the combustion are referred to as setpoint values. The engine control is intended to enforce these setpoint values.

The important physical parameters to be regulated for the air loop and that allow a setpoint value to be defined for $X_{air}$ are as follows:

$P_{IVC}$: the pressure in the combustion chamber upon valve closing. It depends on crank angle $\theta$;

$T_{IVC}$: the temperature in the combustion chamber upon valve closing which depends on crank angle $\theta$; and $X_{IVC}$: the ratio between the burnt gas mass and the total gas mass in the combustion chamber upon valve closing (parameter between 0 and 1) which depends on crank angle $\theta$.

The values of these three parameters are continuously determined. It is therefore assumed that composition (X) and pressure (P) are the same in the cylinder and in the intake manifold where measurements are taken. $T_{IVC}$ is estimated by using the ideal gas law $$T_{IVC} = \frac{P_{IVC} V_{IVC}}{R M_{IVC}}$$

where R is the ideal gas constant (R=287) and $M_{IVC}$ is the mass taken into the cylinder that is measured by a flowmeter. For these three physical parameters linked with the intake of gaseous oxidizer in the combustion chamber of the engine, the setpoint values are respectively denoted by $P^{ref}$, $T^{ref}$ and $X^{ref}$.

These setpoint values are obtained from a setpoint map established on an engine test bench. The setpoint values of these parameters are given by the optimum point mapped on the test bench (values that these parameters must reach). These setpoint values are determined to optimize the combustion.

According to the invention, the important fuel strategy parameter for adapting the fuel loop is the crank angle denoted by $\theta_{inj}$, for which fuel is injected. Its setpoint value is denoted by $\theta_{inj}^{ref}$. This value is also given by the optimum point mapped on the engine test bench. It corresponds to setpoint values $P^{ref}$, $T^{ref}$ and $X^{ref}$.

2—Air Loop Control (Slow Loop)

Once setpoint values $P^{ref}$, $T^{ref}$ and $X^{ref}$ are determined, an engine control system controls actuators in such a way that the values of the physical parameters $P_{IVC}$, $T_{IVC}$ and $X_{IVC}$ are equal to these setpoint values ($P^{ref}$, $T^{ref}$, and $X^{ref}$).

Ideally, the three parameters $P_{IVC}$, $T_{IVC}$ and $X_{IVC}$ instantaneously reach their setpoint values $P^{ref}$, $T^{ref}$ and $X^{ref}$. In reality, the slowness of the air loop results in an error noted in these parameters between the setpoint value and their real value throughout the transition phase. The fuel loop is therefore adapted to the errors on these parameters. Setpoint value $\theta_{inj}^{ref}$ of the injection angle is thus adapted.

3—Correcting the Setpoint Value of the Injection Angle $\theta_{Inj}^{Ref}$

In order to adapt setpoint value $\theta_{inj}^{ref}$ of the injection angle, before the physical parameters reach their setpoint values, the differences between the real values ($P_{IVC}$, $T_{IVC}$ and $X_{IVC}$) of these parameters and the setpoint values ($P^{ref}$, $T^{ref}$, $X^{ref}$) of these parameters are taken into account upon valve closing. The following notations are used: $dP=P_{IVC}-P_{ref}$, $dT=TI_{IVC}-T_{ref}$ and $dX=X_{IVC}-X_{ref}$.

A new corrected injection angle $\theta_{inj}^{cor}=\theta_{inj}^{ref}+d\theta_{inj}$ is therefore sought so that the start of combustion angle $\theta_{soc}$ is the same. This angle is defined by $P^{ref}$, $T^{ref}$, and $X^{ref}$. Therefore $d\theta_{inj}$ is sought such that:
- if there is no error, that is if all the parameters have reached their setpoint value, (dP,dT,dX)=(0,0,0), the situation is exactly that of the working point. Thus $d\theta_{inj}=0$;
- if the parameters have not reached their setpoint value, (dP,dT,dX)≠(0,0,0), an angular correction $d\theta_{inj}\neq$ is introduced to have the same start of combustion angle $\theta_{soc}$.

Then modelling of the combustion system is performed. Therefore, the "Knock integral" model is used as a basis. This model is described in the following document:

K. Swan, M. Shahbakhti and C. R. Koch, "Predicting Start of Combustion Using a modified Knock Integral Method for an HCCI Engine", in Proc. Of SAE Conference, 2006.

According to this model, start of combustion does not occur immediately after fuel injection. There is an auto-ignition delay period that is modelled in form of the Knock integral. The latter allows determination of the start of combustion angle $\theta_{soc}$, from the values of parameters P, T, X and $\theta_{inj}$:

$$\int_{\theta_{inj}}^{\theta_{soc}} g(P(\theta), T(\theta), X(\theta))\, d\theta = 1$$

with:
P is the pressure in the combustion chamber, depending on crank angle $\theta$;
T is the temperature in the combustion chamber, depending on crank angle $\theta$; and
X is the ratio of the burnt gas mass to the total gas mass in the combustion chamber (parameter between 0 and 1). It depends on crank angle $\theta$.

$$g(P, T, X) = \frac{A}{C_1 + C_2 X} \cdot P^n \cdot \exp\left(\frac{T_A}{T}\right)$$

A, $C_1$, $C_2$, n and $T_A$, fixed physical parameters to be calibrated.

Then it is considered that, before the start of combustion, the gas mixture is under adiabatic compression. Knowledge of $P(\theta)$, $T(\theta)$ can thus be readily reduced to that of $P_{IVC}$, $T_{IVC}$ and of the volume of the chamber $V(\theta)$ with the volume of the chamber being perfectly known. Furthermore, the burnt gas ratio does not evolve throughout the compression phase without combustion $X(\theta)=X_{IVC}$. The Knock integral can thus be reduced to the following integral:

$$\int_{\theta_{inj}}^{\theta_{soc}} f(P_{IVC}, T_{IVC}, X_{IVC}, \theta)\, d\theta = 1$$

with f an entirely known function defined in the Appendix.

Finally, by linearizing the Knock integral to the first order, correction $d\theta_{inj}$ is expressed (Thus, the following small perturbations are assumed: $d\theta_{inj} \ll \theta_{inj}$, $dP \ll P_{ref}$, $dT \ll T_{ref}$ and $dX \ll X_{ref}$):

$$d\theta_{inj}=\alpha_P \cdot dP + \alpha_T \cdot dT + \alpha_X \cdot dX$$

Linearization coefficients $\alpha_P$, $\alpha_T$ and $\alpha_X$ represent the respective influences of the three errors dP, dT, dX on the corrections to be brought to $\theta_{inj}$ to keep the same start of injection angle. Their expressions are given in the Appendix.

Experiments are carried out on the engine test bench for calibration of the parameters of the model (A, $C_1$, $C_2$, n and $T_A$). During these experiments, the start of combustion calculated from the setpoint data obtained from mapping is determined. The start of combustion is then estimated by the model which is selected. Parameters A, $C_1$, $C_2$, n and $T_A$ are then varied in order to obtain a good correlation between the start of combustion calculated with the setpoint data and that estimated using the model.

An example of a set of parameters obtained from such a calibration is given in the table below:

| | Parameter | | | | |
|---|---|---|---|---|---|
| | A | $C_1$ | $C_2$ | n | $T_A$ |
| Unit | $(hPa)^{-n} s^{-1}$ | 1 | 1 | 1 | °K |
| Value | 0.22 | 1 | 10.5 | 1.13 | 1732 |

Figure 2:
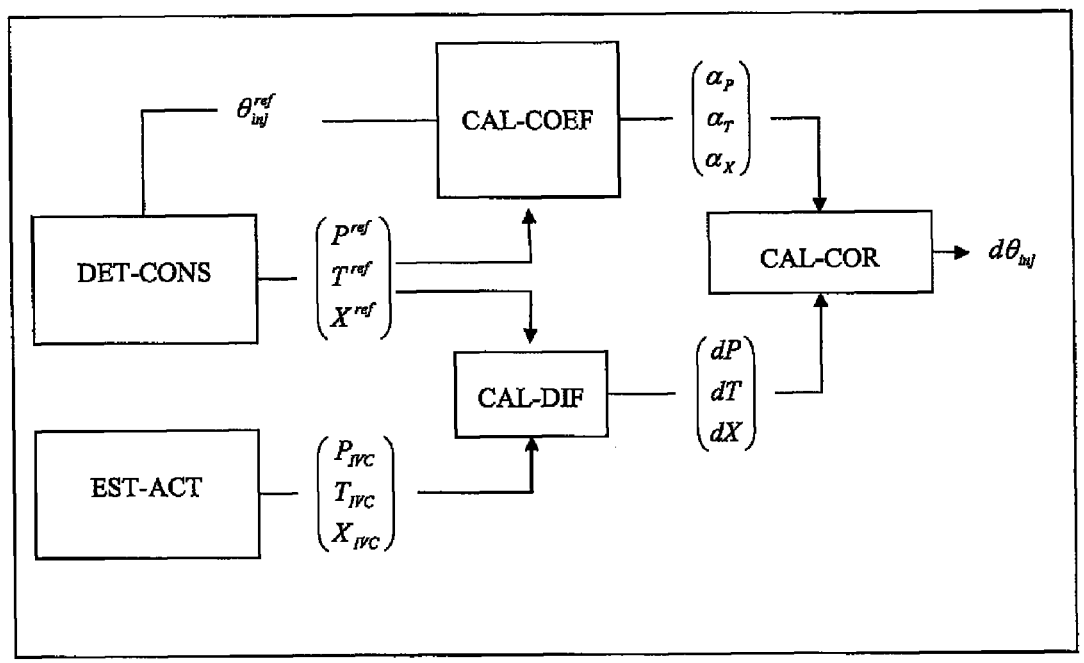
FIG. 2 illustrates a calculation scheme for correction $d\theta_{inj}$ of the fuel injection angle.

FIG. 2 illustrates a calculation scheme for correction $d\theta_{inj}$ of the fuel injection angle. After estimating (EST-ACT) the real values of $P_{IVC}$, $T_{IVC}$ and $X_{IVC}$, determining (DET-CONS), the setpoint values $P^{ref}$, $T^{ref}$, $X^{ref}$ and $\theta_{inj}^{ref}$, and (CAL-DIF) differences dP, dT and dX are calculated. Then (CAL-COEFF) linearization coefficients $\alpha_P$, $\alpha_T$ and $\alpha_X$ are calculated. Finally, in accordance with the combustion model selected (Knock integral under hypotheses), (CAL-COR) correction $d\theta_{inj}$ is calculated with the following relationship:

$$d\theta_{inj}=\alpha_P \cdot dP + \alpha_T \cdot dT + \alpha_X \cdot dX$$

4—Fuel Loop Adaptation (Fast Loop)

The engine control system drives the fuel injection system in the combustion chamber when the crank angle is equal to the corrected setpoint value $\theta_{inj}^{ref}$ in order to keep combustion optimal.

By applying the previous correction to the injection angle, it can then be ensured that the start of combustion angle remains constant. Little by little, the air loop errors dP, dT and dX $_{move}$ towards zero, and the correction disappears in the stabilized static phases.

One use of the method is to directly relate the air loop errors to the correction to be applied to the fuel command via coefficients ($\alpha_P$, $\alpha_T$, $\alpha_X$) that are entirely calculable since everything is perfectly known (function $f$, setpoint values $P^{ref}$, $T^{ref}$, $X^{ref}$).

The method according to the invention can be used in diesel engines. Thus, the invention relates to a diesel engine for implementing the method of the invention. A diesel engine for implementing the method comprises at least one combustion chamber, a system for injecting fuel into the combustion chamber, at least one intake pipe for intake into the combustion chamber of a gaseous oxidizer and an engine control system for controlling actuators. The engine also comprises means for determining setpoint values ($P^{ref}$, $T^{ref}$, $X^{ref}$) to be applied to physical parameters linked with the intake of the gaseous oxidizer in the combustion chamber and a setpoint value $\theta_{inj}^{ref}$ of a crank angle at which fuel has to be injected into the combustion chamber.

Finally, according to the invention, this engine comprises means such as a calculator, for correcting the setpoint value $\theta_{inj}^{ref}$ before the physical parameters reach their setpoint values, by accounting for a difference between real values of the physical parameters and the setpoint values of these physical parameters ($P^{ref}$, $T^{ref}$, $X^{ref}$). The engine also comprises an engine control system capable of controlling the injection system so as to inject fuel into the combustion chamber when the crank angle is equal to the corrected setpoint value $\theta_{inj}^{ref}$ in order to keep combustion optimal.

APPENDIX

Expression of Function $f$

Function $f$ appears in the Knock integral when the following hypotheses are made:

Before the start of combustion, the gas mixture is perfect and under adiabatic compression:

$$P(\theta) \cdot V(\theta)^\gamma = cste \Rightarrow P(\theta) = P_{IVC} \cdot v^\gamma(\theta)$$

$$T(\theta) \cdot V(\theta)^{\gamma-1} = cste \Rightarrow T(\theta) = T_{IVC} \cdot v^{\gamma-1}(\theta)$$

with:

| | | |
|---|---|---|
| $v(\theta) = \dfrac{V_{IVC}}{V(\theta)}$ | being an entirely known volume function | |
| $V_{IVC}$ | is chamber volume upon valve closing | |
| $V(\theta)$ | is chamber volume as a function of crank angle | |
| $\gamma(X)$ | is an adiabatic compression parameter. It notably depends on the chemical composition X. | |

The burnt gas ratio does not evolve throughout the compression phase without combustion:

$$X(\theta) = X_{IVC}$$

Thus, the following Knock integral is obtained:

$$\int_{\theta_{inj}}^{\theta_{soc}} \frac{A}{C_1 + C_2 X_{IVC}} \cdot P_{IVC}^n \cdot v^{\gamma(X_{IVC}) \cdot n}(\theta) \exp\left(-\frac{T_A}{T_{IVC}} \cdot v^{1-\gamma(X_{IVC})}(\theta)\right) d\theta = 1$$

That is the following general equation:

$$\int_{\theta_{inj}}^{\theta_{soc}} f(P_{IVC}, T_{IVC}, X_{IVC}, \theta) d\theta = 1$$

with:

$$f(P_{IVC}, T_{IVC}, X_{IVC}, \theta) = \frac{A}{C_1 + C_2 X_{IVC}} \cdot P_{IVC}^n \cdot v^{\gamma(X_{IVC}) \cdot n}(\theta) \exp\left(-\frac{T_A}{T_{IVC}} \cdot v^{1-\gamma(X_{IVC})}(\theta)\right)$$

Expression of the Linearization Coefficients ($\alpha_P$, $\alpha_T$, $\alpha_X$)

$$d\theta_{inj} = \alpha_P \cdot dP + \alpha_T \cdot dT + \alpha_X \cdot dX$$

Parameters $\alpha_P$, $\alpha_T$, $\alpha_X$ represent the respective influences of the three errors dP, dT and dX on the correction to be made to $\theta_{inj}$ in order to keep the same start of combustion angle. Their expressions are as follows:

$$\alpha_P = \frac{\left(\int_{\theta_{inj}^{ref}}^{\theta_{soc}} \frac{\partial f}{\partial P}(P^{ref}, T^{ref}, X^{ref}, \theta) d\theta\right)}{f(P^{ref}, T^{ref}, X^{ref}, \theta_{inj}^{ref})} = -\frac{n}{P_{ref}} \cdot \frac{1}{f(P^{ref}, T^{ref}, X^{ref}, \theta_{inj}^{ref})}$$

$$\alpha_T = \frac{\left(\int_{\theta_{inj}^{ref}}^{\theta_{soc}} \frac{\partial f}{\partial T}(P^{ref}, T^{ref}, X^{ref}, \theta) d\theta\right)}{f(P^{ref}, T^{ref}, X^{ref}, \theta_{inj}^{ref})} =$$

$$= \frac{-\dfrac{T_A}{T_{IVC}^2} \cdot \left(\int_{\theta_{inj}^{ref}}^{\theta_{soc}} f(P^{ref}, T^{ref}, X^{ref}, \theta) \cdot v^{1-\gamma}(\theta) d\theta\right)}{f(P^{ref}, T^{ref}, X^{ref}, \theta_{inj}^{ref})}$$

$$\alpha_X = \frac{\left(\int_{\theta_{inj}^{ref}}^{\theta_{soc}} \frac{\partial f}{\partial X}(P^{ref}, T^{ref}, X^{ref}, \theta) d\theta\right)}{f(P^{ref}, T^{ref}, X^{ref}, \theta_{inj}^{ref})}$$

$$= \frac{\left(\dfrac{C_2}{C_1 + C_2 X^{ref}} - \left(\int_{\theta_{inj}^{ref}}^{\theta_{soc}} f(P^{ref}, T^{ref}, X^{ref}, \theta) \cdot \ln(v(\theta))\left[n + \dfrac{T_A}{T_{IVC}} v^{1-\gamma}(\theta)\right] d\theta\right) \cdot \dfrac{d\gamma}{dX}(T^{ref}, X^{ref})\right)}{f(P^{ref}, T^{ref}, X^{ref}, \theta_{inj}^{ref})}$$

The invention claimed is:

1. A method of controlling combustion of a diesel engine including a combustion chamber and an engine control system for controlling actuators so that physical parameters are equal to setpoint values of the physical parameters, comprising:

determining the setpoint values for physical parameters linked with intake of a gaseous oxidizer into the combustion chamber and a setpoint value for a crank angle at which fuel is to be injected into the combustion chamber, the setpoint values being used for optimizing combustion; and controlling the actuators with the engine control system so that the values of the physical parameters are equal to the setpoint values, including correcting the setpoint value for the crank angle before the physical parameters reach their setpoint values by accounting for differences between real values of the physical parameters and the setpoint values of the physical parameters, and controlling fuel injection into the combustion chamber with the engine control system when the crank angle is equal to the corrected setpoint value of the crank angle for optimizing combustion.

2. A method of control as claimed in claim 1, wherein a correction $d\theta_{inj}$ is determined by estimating the real values of the physical parameters, calculating differences dP, dT and dX between the real values and the setpoint values, calculating linearization coefficients $\alpha_P$, $\alpha_T$, $\alpha_X$ defined by linearization of the Knock integral to be first order, and calculating the correction $d\theta_{inj}$ to be:

$$d\theta_{inj} = \alpha_P \cdot dP + \alpha_T \cdot dT + \alpha_X \cdot dX.$$

3. A method of control as claimed in claim 1, wherein the physical parameters are selected from parameters upon valve closing as follows: pressure in the combustion chamber, temperature in the combustion chamber, and a ratio between a burnt gas mass and a total gas mass in the combustion chamber.

4. A method of control as claimed in claim 2, wherein the physical parameters are selected from parameters upon valve closing as follows: pressure in the combustion chamber, temperature in the combustion chamber, and a ratio between a burnt gas mass and a total gas mass in the combustion chamber.

5. A method of control as in claim 1, wherein the setpoint values are determined by a setpoint map obtained from engine testing.

6. A method of control as in claim 2, wherein the setpoint values are determined by a setpoint map obtained from engine testing.

7. A method of control as in claim 3, wherein the setpoint values are determined by a setpoint map obtained from engine testing.

8. A method of control as in claim 4, wherein the setpoint values are determined by a setpoint map obtained from engine testing.

9. A diesel engine comprising:
at least one combustion chamber, an injection system for injecting fuel into the combustion chamber, at least one intake providing intake of a gaseous oxidizer, into the combustion chamber, an engine control system for controlling actuators, means for determining setpoint values to be applied to physical parameters linked with the intake of the gaseous oxidizer into the combustion chamber and for determining a setpoint value of a crank angle at which a fuel is to be injected into the combustion chamber, and means for correcting the setpoint value of the crank angle before the physical parameters reach their setpoint values, by accounting for a difference between real values of the physical parameters and the setpoint values of the physical parameters, and wherein the engine control system controls the injection system to inject fuel into the combustion chamber when the crank angle is equal to the corrected setpoint value of the crank angle to optimize combustion.

* * * * *